United States Patent [19]

Foulkes

[11] 3,980,751

[45] Sept. 14, 1976

[54] ION EXCHANGE CHROMATE REMOVAL
[75] Inventor: Frank R. Foulkes, Toronto, Canada
[73] Assignee: Huron Chemicals Limited, Kingston, Canada
[22] Filed: Nov. 20, 1975
[21] Appl. No.: 633,831

[30] Foreign Application Priority Data
Nov. 20, 1974 Canada .................................. 214231

[52] U.S. Cl. ................................. 423/54; 423/478; 204/95
[51] Int. Cl.² ................... C01G 37/14; C01B 11/02; C25B 1/26
[58] Field of Search ............. 423/54, 478, 475, 181; 204/95; 210/24, 32, 34, 35, 37 R, 37 B

[56] References Cited
UNITED STATES PATENTS

| | | | |
|---|---|---|---|
| 3,223,620 | 12/1965 | Oberhofer | 210/37 B |
| 3,414,510 | 12/1968 | Oberhofer | 210/37 B |
| 3,664,950 | 5/1972 | Saraceno et al. | 423/54 |
| 3,835,001 | 9/1974 | O'Brien | 423/54 |

Primary Examiner—Oscar R. Vertiz
Assistant Examiner—Brian E. Hearn
Attorney, Agent, or Firm—Spencer & Kaye

[57] ABSTRACT

The present invention relates to removal of chromate from an aqueous solution of an alkali metal chlorate and chloride, particularly sodium chlorate and sodium chloride in a selected ratio which has been obtained by the electrolysis of an aqueous solution of alkali metal chloride containing chromate in which the essentially chromate free aqueous solution of alkali metal chlorate and chloride contains the chlorate and chloride in essentially the same selected ratio. In the process the chromate containing aqueous solution of alkali metal chlorate and chloride is acidified with hydrochloric acid to a pH value not smaller than 0.5 and passed through an anionic ion exchange resin bed which has previously been saturated with alkali metal chlorate and chloride. The bed is then regenerated by passing an aqueous solution of an alkali metal hydroxide and alkali metal chloride therethrough to remove chromate therefrom. An acidified aqueous solution of alkali metal chloride is then passed through the bed to convert the resin to an acid form and an aqueous solution of essentially chromate free alkali metal chlorate and chloride acidified with hydrochloric acid to a low pH value but not smaller than 0.5 is passed through the bed to saturate the resin with the alkali metal chlorate. The effluents from the regeneration stages may then be used as feedstock for the electrolysis to produce the aqueous solution of alkali metal chlorate and chloride, after suitable additions of chromate and chloride solutions.

13 Claims, 3 Drawing Figures

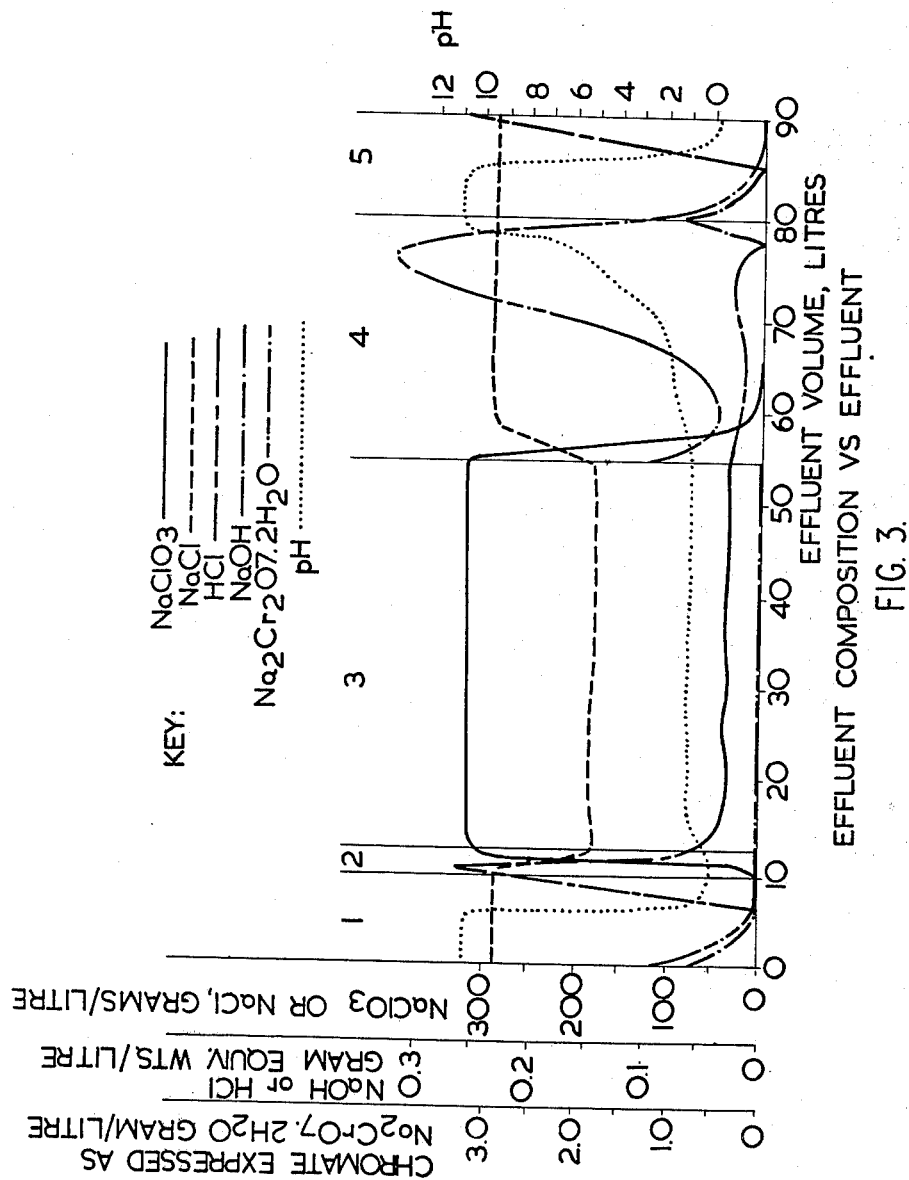

ION EXCHANGE CHROMATE REMOVAL

The present invention relates to the removal of chromium values from aqueous solutions containing high concentrations of alkali metal chlorates and alkali metal chlorides, particularly sodium chlorate and sodium chloride. In particular, the present invention relates to the removal of chromate from such solutions without significantly altering the ratio of alkali metal chlorate to alkali metal chloride in the solution.

In the production of chlorine dioxide for use inter alia in the bleaching of chemical cellulosic pulps an aqueous solution of an alkali metal chlorate and an alkali metal chloride, particularly sodium chlorate and sodium chloride, is reacted, in a chlorine dioxide generator such as an R-2 generator, with a mineral acid, particularly sulfuric acid. In such a process the aqueous solution contains the sodium chlorate and sodium chloride in a selected ratio which is conducive to optimum production of chlorine dioxide.

The aqueous solution of the sodium chlorate and sodium chloride is conventionally produced by the electrolysis of brine in electrolytic cells, usually bipolar electrolytic cells, the extent of the electrolysis suitably being controlled to produce an effluent from the cell in which the sodium chlorate and sodium chloride have essentially the selected ratio for optimum production of chlorine dioxide in the chlorine dioxide generator. However, in the electrolysis of the sodium chloride in the bipolar electrolytic cells to form sodium chlorate, it is conventional to add chromates to the electrolyte in the cell because the chromates significantly improve the current efficiency of the cells in the conversion of the sodium chloride to sodium chlorate. By the term "chromate" we mean any of the species chromate, dichromate, and polychromate, the form being determined primarily by the pH. Chromate thus occurs in significant amounts in the cell effluent and it is desirable to remove this chromate from the cell effluent before it is processed in the chlorine dioxide generator as it is considered to have an adverse effect upon the production of the chlorine dioxide. Equally important, chromate is a valuable material; hence it is desirable to recover it for re-use in the electrolytic cells. Further, if the chromate passes into the chlorine dioxide generator, it is liable to be present in the waste effluent from the chlorine dioxide generator, and eventually reappear in the outside environment as a toxic pollutant.

A well known method of removing chromate from solution involves the batch-wise chemical reduction of hexavalent chromium to trivalent chromium with a chemical reducing agent such as zinc hydrosulfide in an acid medium followed by the adjustment to an alkaline pH and precipitation of the trivalent chromium as chromium hydroxide. In the chemical reduction method not only is pH control sometimes difficult but greater than stoichiometric quantities of the various chemical reagents are usually required; and from a pollution standpoint, one toxic pollutant (chromate) is replaced by another, (such as the reducing agent itself). Further, the processed solution for the chlorine dioxide generator normally ends up alkaline and must be re-acidified for use in the chlorine dioxide generator. Also, noxious gases such as hydrogen sulfide are sometimes evolved. Another method of removing chromates from the cell effluent of a chlorate cell before it is passed to a chlorine dioxide generator is disclosed in Scholander, U.S. Pat. No. 3,427,236. In the process of Scholander, chromate is precipitated as, for example, a barium salt such as barium chromate and filtered and the chromate regenerated by treatment with acid and subsequently with a solution to form a non-soluble salt of the barium. This process involves many steps and involves the use of barium salts which are not in themselves useful in the chromate electrolysis process.

Other processes are also known for removing chromium from aqueous solutions as for example, those disclosed in U.S. Pat. Nos. 3,223,620; 3,306,859; 3,414,510; 3,664,950; 2,733,204; 3,417,016; and Canadian Pat. Nos. 606,022 and 776,176. While the processes described in these patents employ ion exchange resins for the removal of chromate from aqueous solutions, the processes set forth in these patents are unsuitable for removing chromate from a cell effluent containing sodium chlorate and sodium chloride and at the same time, maintain the chlorate-chloride balance in the cell effluent such that it is suitable for use in a chlorine dioxide generator.

The present invention provides a process for the removal of chromate from the cell effluent containing an alkali metal chlorate and an alkali metal chloride in a selected ratio produced by the electrolysis of an aqueous solution of an alkali metal chloride containing chromate in which the selected ratio of chlorate to chloride in the effluent from which chromate has been removed is not significantly different from that in which the chromate is present; and as such, is suitable for use in the chlorine dioxide generator.

It has now been found according to the present invention that by passing the aqueous solution of an alkali metal chlorate and an alkali metal chloride containing chromate acidified with hydrochloric acid to a pH value not smaller than 0.5 through an anionic exchange resin bed which has previously been saturated with an alkali metal chlorate essentially all the chromate is removed from the solution and taken up by the resin without there being a significant change in the ratio of chlorate to chloride in the aqueous solution free from chromate. The chromate loaded resin is then regenerated by passing an aqueous solution of an alkali metal hydroxide and an alkali metal chloride through the resin bed to remove chromate therefrom, then passing an aqueous solution of an alkali metal chloride, acidified with hydrochloric acid to a low pH, through the resin bed to convert the resin to an acid form; and passing an aqueous solution of essentially chromate free alkali metal chlorate and alkali metal chloride acidified with hydrochloric acid to a pH value not smaller than 0.5 through the resin bed to saturate the resin bed with essentially alkali metal chlorate. The effluent solutions from the regeneration stages of the process may be passed to the electrolysis cells for the production of further alkali metal chlorate.

The present invention thus provides in the electrolytic production of an aqueous solution of an alkali metal chlorate and an alkali metal chloride in a preselected ratio by the electrolysis of an aqueous solution containing alkali metal chloride and chromate, a method of removing chromate from said aqueous solution of alkali metal chloride and alkali metal chlorate which comprises in an exhaustion stage, (1) passing said aqueous solution of alkali metal chlorate and alkali metal chloride acidified with hydrochloric acid to quite a low pH but not lower than 0.5 through an anion exchange resin bed which has previously been saturated with alkali metal chlorate to remove chromate therefrom and produce as an essentially chromate free product an aqueous solution of alkali metal chlorate and alkali metal chloride; and in a regeneration stage (2) passing an aqueous solution of alkali metal hydroxide and alkali metal chloride through said resin bed to remove chromate therefrom, (3) passing an aqueous solution of alkali metal chloride acidified with hydrochloric acid to a low pH through said resin bed to convert said resin to an acid form and (4) passing essentially chromate free aqueous solution of alkali metal chlorate and alkali metal chloride acidified with hydrochloric acid to a low pH, but not less than 0.5, through said resin bed to saturate said resin with alkali metal chlorate, and passing said aqueous solution from steps (2), (3) and (4) as a feedstock to said electrolysis.

While the present invention relates generally to alkali metal chlorates and chlorides, it is preferably concerned with sodium chlorate and sodium chloride as these are the more usual materials used in the production of chlorine dioxide and hereinafter reference will be made to sodium chlorate and sodium chloride for convenience.

In a preferred embodiment of the present invention a portion of the essentially chromate free aqueous solution of sodium chlorate and sodium chloride from the exhaustion step (1) is used to saturate the resin with sodium chlorate in step (4). In particular, in the process of the present invention, a plurality of ion exchange resin beds may be used, e.g. two such beds such that when one bed is being regenerated, the other bed is in its exhaustion stage whereby the process may be conducted on a continuous or semi-continuous basis. In such a case, a portion of the chromate free product from one of the beds in its exhaustion stage may be used to saturate the bed in its regeneration stage with sodium chlorate.

The resin bed used in the process of the present invention is suitably in the form of a column and preferably a staggered column in which the walls of the column have longitudinally spaced recesses extending completely around the side wall thereof. Thus, it is found that the process of the present invention is very sensitive to side wall channelling leading to premature chromate breakthrough in the column and the presence of the spaced recesses in the column containing the resin has been found to greatly reduce the channelling effect and in some cases increase the exhaustion stage throughput as much as 400–500% of that attainable with a smooth-walled column. It was further found that this results in a great reduction in the quantities of acid and base regenerants required.

In the process of the present invention it is desirable to employ brine instead of water as the make-up of the regenerant solution, preferably a concentrated brine, and in addition to eliminate a traiditional water washing between cycles, whereby a completely recycling non-diluting process may be achieved and the regenerant effluent from the resin bed may be used as the feedstock to the electrolytic chlorate cell. In the regeneration stage it is preferable that the flow of liquid is counter-current to the flow of liquid in the exhaustion cycle. In the exhaustion stage the flow of liquid may be either up-flow or down-flow through the column.

It is desirable that the exhaustion cycle be operated at low pH, suitable below 3, in order to provide for optimum removal of chromate from the aqueous solution. However, at a pH below about 0.5 it is found that the sodium chlorate tends to decompose to form chlorine dioxide, and for this reason the pH in the exhaustion stage is maintained in the range of 0.5 to 3. Similarly, in the regeneration stage, (4) as sodium chlorate is also present, the pH is again suitably below 3 but not less than 0.5. In regeneration stage (c) where no sodium chlorate is present in the resin or the aqueous solution used in the regeneration stage (3), the pH is suitably in the range 0–3.

The present invention will be further illustrated by way of the following Example in conjunction with the accompanying drawings in which:

FIG. 3 is a graph of effluent composition versus effluent volume in the various stages of the process described in the Example.

Figure 2:
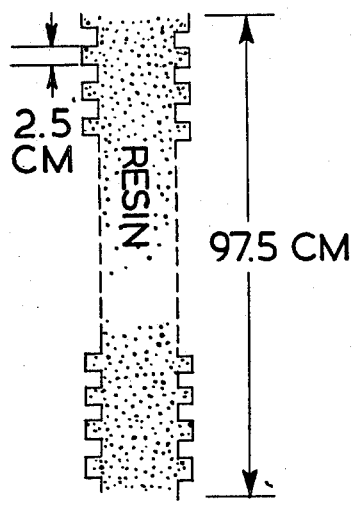
FIG. 2 is a detail of an ion-exchange resin column used in such recovery system.

The column shown in FIG. 2 has a resin volume of 1,500 cc, the resin being Bayer Lewatit MP-62 resin with an ultimate ion exchange capacity of 1.9 meq/ml. the column having smaller internal diameter of 3.8 cm., a larger internal diameter of 5.50 cm., an average cross-sectional area of 15.38 sq.cm. and a bed length of 97.5 cm.

In the process, the effluent from the electrolytic chlorate cells has a sodium chlorate to sodium chloride ratio suitable for use in a chlorine dioxide generator, particularly an R-2 generator, and in the Example the effluent will be referred to as the R-2 feed.

Example

Figure 1:
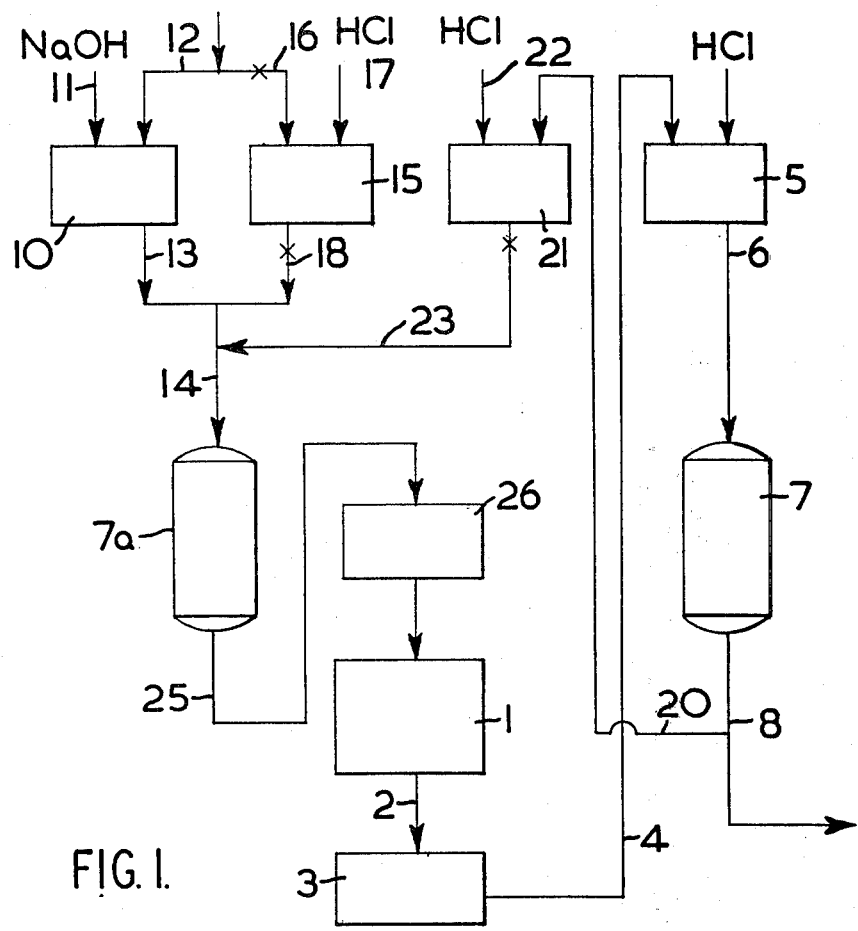
FIG. 1 is a schematic representation of a chromate recovery system in a plant for producing sodium chlorate in accordance with a particular embodiment of the present invention.

The R-2 feed is an aqueous solution containing 324 g/l. of sodium chlorate and 184 g/l. of sodium chloride and 1.2 g/l. of sodium dichromate dihydrate and passes from the electrolytic chlorate cells 1 of FIG. 1 via line 2 to de-hypo stage 3 whence it passes via line 4 to a mixer 5 where the pH is adjusted to about 1.0 by the addition of hydrochloric acid thereto such that the feed solution is about 0.03N with respect to HCl. The R-2 feed then passes through line 6 to the top of the ion exchange column 7 which is of the aforesaid structure and composition and passes downwardly through the resin and exits as an essentially chromate free product through line 8. The product has the composition shown in Section 1 of FIG. 3 and the composition of the product is essentially the same as that of the feed except that the chromate concentration is reduced to less than 1 part per million, expressed as sodium dichromate dihydrate, and the flow is discontinued when chromate breaks through the column at about 10 parts per million. At the termination of this exhaustion stage, the fraction of the resin exchange sites occupied by the various salts is shown in Table 1. Thus, about 10% of the theoretical resin capacity exchanges chromate and more than 99.9% by weight of the chromate is removed from the feed. The resin used in this column has been presaturated with sodium chlorate in a previous regeneration cycle (acidified R-2, cycle 4 Tables 2,3) and it initially is loaded as indicated at the end of cycle 4 of Table 1.

In the regeneration stage, a primary regenerant consisting of 0.1 N. sodium hydroxide in concentrated brine (NaCl – 285 g/l.) is passed upwardly through the column 7A for counter-current regeneration. The primary regenerant enters from a mixer 10 where sodium hydroxide entering through line 11 and concentrated brine entering through line 12 are mixed, the primary regenerant passing through lines 13 and 14 to the bottom of the column 7A. The effluent from the column 7A leaves the top thereof as recovered chromate and has the composition shown in cycle 2 of FIG. 3. The primary regenerant strips the chromate from the resin leaving the loading of the bed as shown in Table 1. About 95% by weight of the recovered chromate is contained in the effluent from this step.

As the up-take of chromate by the bed is most effective when the resin bed is acidic and at a preferred pH in the range 0–3 the next step in regeneration is the upward passage of the acidified brine regenerant containing sodium chloride 280 g/l. and 0.305 N with respect to hydrochloric acid. This acidified brine is formed in the tank 15 from concentrated brine entering through line 16 and hydrochloric acid entering through line 17 and is passed to the bottom of the column 7A via line 18 and 14. The composition of the effluent on the acidified brine regenerant stage is shown in section 3 of FIG. 3. The remaining 5% of the recovered chromate is contained in the effluent from this step. This step is allowed to continue past the hydrochloric acid breakthrough point to ensure complete conversion of the resin to acid form. The acidified brine leaves the bed in the stage of loading shown in Table 1.

As the resin is selective toward chlorate, if an exhaustion stage was attempted directly following the acidified brine step, significant amounts of sodium chlorate would be removed from the R-2 feed which at the same time would become over-rich in sodium chloride with the sodium chloride displaced from the resin. For this reason, the bed is first pre-equilibriated with an acidified R-2 solution which is free of chromate of about pH 0.5, i.e. about 0.05 N with respect to HCl. The acid is needed to maintain the bed at a lower pH. However, greater acidity must be avoided to prevent the formation of chlorine dioxide. Thus, in particular, a chromate free R-2 product is bled off from line 8 via line 20 to an acidified R-2 mixer 21 where it is mixed with hydrochloric acid entering through line 22. The mixture is then passed through lines 23 and 14 to the bottom of the ion exchange column 7A. The composition of the effluent from the acidified R-2 step is shown in Section 4 of FIG. 3 and the acidified R-2 step leaves the bed loaded as shown in Table 1. This completes the regeneration stage and the bed is now ready for another exhaustion stage as the bed is saturated with sodium chlorate and the effluents are equal to those of the exhaustion cycle (1). Effluents from the column 7A containing the recovered chromate are passed through line 25 to a mixing tank 26 in which they are mixed together with any further fresh brine and/or additives to form the feed to the electrolytic chlorate cells 1. The experimental conditions of the run are set forth in Tables 2 and 3.

Table 1

BED LOADING AT FINISH OF VARIOUS STEPS, AS % OF ION EXCHANGE CAPACITY

|  | NaCl | NaClO₃ | HCl | NaOH | Chromate as Na₂Cr₂O₇.2H₂O |
|---|---|---|---|---|---|
| Exhaustion (No. 1) | 9.32 | 74.21 | 7.50 | 0 | 8.97 |
| Primary (No. 2) | 15.10 | 0 | 0 | 84.90 | (trace:~0.74%) |
| Acid. Brine (No. 3) | 69.80 | 0 | 30.20 | 0 | 0 |
| Acid. R-2 (No. 4) | 3.32 | 87.05 | 9.63 | 0 | 0 |

Table 2

COMPOSITION OF VARIOUS STREAMS, GPL (USED FOR MASS BALANCE)

|  | [NaCl] | [NaClO₃] | [HCl] | [NaOH] | [Na₂Cr₂O₇.2H₂O] | pH | Volume ml. |
|---|---|---|---|---|---|---|---|
| Exhaustion Feed (No. 1) | 184.57 | 324.12 | 1.09 | 0 | 1.20 | ~1.0 | 42,080 |
| Primary Regenerant (No. 2) | 285.00 | 0 | 0 | 4.00 | 0 | ~11.1 | 26,444 |
| Acidified Brine (No. 3) | 280.00 | 0 | 11.12 | 0 | 0 | ~0.15 | 10,836 |
| Acidified R-2 (No. 4) | 184.57 | 324.12 | 1.82 | 0 | 0 | ~0.5 | 2,925 |

BED: 1500 ML, BAYER LEWATIT MP-62
TOTAL ION EXCHANGE CAPACITY = 2.85 GRAM-EQUIVALENT WEIGHTS
VOID VOLUME = 525 ML

Table 3

MASS BALANCE ON ONE COMPLETE CYCLE

|  | NaCl(g) | NaClO₃(g) | HCl(g) | NaOH(g) | Chromate as Na₂Cr₂O₇.2H₂O(g) |
|---|---|---|---|---|---|
| IN |  |  |  |  |  |
| Exhaustion Cycle (No. 1) | 7766.64 | 13639.90 | 45.86 | 0 | 50.50 |
| Primary Regenerant Cycle (No. 2) | 7536.50 | 0 | 0 | 105.78 | 0 |
| Acidified Brine Cycle (No. 3) | 3034.08 | 0 | 120.50 | 0 | 0 |
| Acidified R-2 Cycle (No. 4) | 514.80 | 884.75 | 5.32 | 0 | 0 |
| In Voids Initially | 96.90 | 170.16 | 0.96 | 0 | 0 |
| On Bed Initially | 5.53 | 264.10 | 9.99 | 0 | 0 |
| Neutralization During Prim. Step | +1.60 | 0 | −1.00 | −1.10 | 0 |
| Neutralization During Acid. Brine Step | +88.84 | 0 | −55.40 | −60.80 | 0 |
| Total: | 19044.89 | 14958.91 | 126.23 | 43.88 | 50.50 |
| OUT |  |  |  |  |  |
| Exhaustion Cycle (No. 1) | 7756.62 | 13678.86 | 48.44 | 0 | 0.04 |
| Primary Regenerant Cycle (No. 2) | 7475.80 | 395.30 | 7.37 | 5.78 | 47.33 |
| Acidified Brine Cycle (No. 3) | 3034.41 | 0 | 27.89 | 38.10 | 3.13 |
| Acidified R-2 Cycle (No. 4) | 675.63 | 450.49 | 31.58 | 0 | 0 |
| In Voids at Finish | 96.90 | 170.16 | 0.96 | 0 | 0 |
| On Bed at Finish | 5.53 | 264.10 | 9.99 | 0 | 0 |

Table 3-continued

MASS BALANCE ON ONE COMPLETE CYCLE

| | NaCl(g) | NaClO$_3$(g) | HCl(g) | NaOH(g) | Chromate as Na$_2$Cr$_2$O$_7$.2H$_2$O(g) |
|---|---|---|---|---|---|
| Total: | 19044.89 | 14958.91 | 126.23 | 43.88 | 50.50 |

During the acidified brine step following the primary regeneration step and also to a slight extent in the primary regeneration step following the exhaustion stage some acid-base neutralization occurs at the interface between the two different solutions inside the bed. In the column, this amount is 1.55 grams-equivalent weight (gew) of neutralization resulting in the production of 90.44 g. of extra sodium chloride. It will be realized that by employing concentrated brine instead of water for the make-up of the regeneration solution and by eliminating traditional water washing between cycles, a completely recycling non-diluting process is achieved and the regenerant effluents as aforesaid from the column 7A become the feedstock to the electrolytic chlorate cell 1 after mixing in tank 26 with fresh brine supplied through line 27. Fresh chromate in any appreciable amount is not required since the recovered chromate is fed to tank 26. Only small amounts of fresh chromate, i.e. 0.02 g/l need be added to the fresh brine to make up for the losses in the process (see Table 3). The new brine feed solution can be fed into the electrolytic chlorate cell and the resulting process is continuous. As is common practice, evaporation in the electrolytic cell will help to control the temperature of the liquor and will keep the concentration of the product at the desired level.

The data given in Tables 1, 2, 3 refer to a specific example of an electrolytic cell product, an R-2 solution with 184.6 g/l NaCl and 324.1 g/l NaClO$_3$. Other solutions are commonly produced with other concentrations of chlorate and/or of other salts or compounds, by electrolysis, catalysis or other chemical reaction and also for these solutions the process can be shown to operate leaving a product substantially free of chromate, and a chromate salt in a form that can be easily recycled.

The method of the present invention of chromate removal from R-2 solutions as set forth above has several advantages over the other methods of chromate removal, and further, chemical costs of the process appear to be competitive with other methods. In particular, the process of the present invention comprises the following advantages.

1. It is capable of recovering chromates from chlorate liquor without affecting the sodium chlorate-sodium chloride concentration therein.
2. It provides a product solution which contains less than 1 part per million sodium dichromate dihydrate.
3. It is economically competitive with other methods of chromate removal.
4. It provides for an essentially 100% recycling of the chromate and provides no polluting waste products and no wasteful depletion of valuable chromium.
5. It provides for simple monitoring since chromate breakthrough is easily identified by the characteristic colour of the effluent and the only monitoring required is pH and flowrate.
6. It is a clean process involving no obnoxious gases evolved or messy handling problems to contend with.
7. It uses the regenerant effluents for the feedstock of electrolytic chlorate cells.
8. It handles concentrated brine solutions without introducing a dilution problem and further there are no water rinse cycles involved.
9. The processed chlorate liquor which is essentially free of chromate contains excess HCl which can be charged to the chlorine dioxide generator, as the equivalent of sulphuric acid and sodium chloride.
10. It is quite insensitive to flowrate fluctuations.
11. The process produces a pre-acidified chlorate cell feedstock which is desirable. The degree of pre-acidification can be controlled by controlling the degree of HCl breakthrough during the acidified brine cycle; and
12. The regeneration stage of the process of the present invention not only strips essentially all the chromate from the exhausted resin but acidifies the resin bed and pre-loads it with chlorate to prevent alteration in composition of the processed chlorate liquor.

What I claim is:

1. A method of removing chromate from aqueous solutions of alkali metal chlorate and alkali metal chloride which comprises in an exhaustion stage (1) passing said aqueous solution of alkali metal chlorate and alkali metal chloride acidified with hydrochloric acid to a pH of not less than 0.5 through an anion exchange resin bed to remove chromate therefrom and produce an essentially chromate free aqueous solution containing alkali metal chlorate and alkali metal chloride, and in a regeneration stage (2) passing an aqueous solution of alkali metal hydroxide and alkali metal chloride through said resin bed to remove chromate therefrom, (3) passing an aqueous solution of alkali metal chloride acidified with hydrochloric acid to a low pH through said resin bed to convert said resin to acid form and (4) passing an aqueous solution of essentially chromate free alkali metal chlorate and alkali metal chloride acidified with hydrochloric acid to a pH value not less than 0.5, through said resin bed to saturate said resin bed with alkali metal chlorate.

2. A process as claimed in claim 1 in which the aqueous solution of alkali metal chlorate and alkali metal chloride from which chromate is to be removed is the product of an electrolytic cell.

3. A process as claimed in claim 1 where the aqueous solutions from steps (2), (3) and (4) are passed as feedstock to an electrolytic cell.

4. A process as claimed in claim 1 in which the alkali metal is sodium.

5. A process as claimed in claim 4 in which a portion of the essentially chromate free aqueous solution of sodium chlorate and sodium chloride from step (1) is used in step (4).

6. A method as claimed in claim 4, in which the solutions indicated under (2), (3) and (4) are entirely used as feed stock for an electrolytic cell.

7. A process as claimed in claim 4 in which the pH in steps (1), (3) and (4) is not numerically greater than 3.

8. A method as claimed in claim 5 in which the solutions indicated under (2), (3) and (4) are entirely used as feed stock for an electrolytic cell.

9. A method as claimed in claim 7, in which the solutions indicated under (2), (3) and (4) are entirely used as feed stock for an electrolytic cell.

10. A method as claimed in claim 1 in which the flow of the solution in the regenerating stage is counter to the flow in the exhaustion stage.

11. A process as claimed in claim 1 in which the anionic exchange resin is a weakly basic resin.

12. A method as claimed in claim 1 in which the bed contains a vertical staggered column having longitudinally spaced recesses extending completely around the side walls thereof.

13. A method as claimed in claim 1 in which the product effluent is fed to a chlorine dioxide generator for production of chlorine dioxide.

* * * * *